United States Patent

[11] 3,621,435

| | | |
|---|---|---|
| [72] | Inventor | Cecil K. Stedman<br>New Denver, British Columbia, Canada |
| [21] | Appl. No. | 21,560 |
| [22] | Filed | Mar. 23, 1970 |
| [23] | | Division of Ser. No. 633,116, Apr. 24, 1967, Pat. No. 3,479,739. |
| [45] | Patented | Nov. 16, 1971 |
| [73] | Assignee | Statham Instruments, Inc.<br>Oxnard, Calif.<br>Continuation-in-part of application Ser. No. 817,008, Apr. 17, 1969, now abandoned. |

[54] TRANSDUCER BEAM WITH BACK-TO-BACK RELATED DEPOSITED FILM TYPE STRAIN GAGES
11 Claims, 6 Drawing Figs.

[52] U.S. Cl. .................................................... 338/2, 338/5
[51] Int. Cl. .................................................... G01b 7/16
[50] Field of Search ........................................ 338/2, 3, 4, 5, 6; 29/620

[56] References Cited
UNITED STATES PATENTS
3,124,769  3/1964  Peterson ...................... 338/2

Primary Examiner—Rodney D. Bennett, Jr.
Assistant Examiner—R. Kinberg
Attorney—Graybeal, Cole and Barnard ABSTRACT: Transducer structure in the nature of a thin, laminated, flexural element having evaporated film strain gages on each of two opposite surfaces. Fabrication method involving simultaneously depositing by a single-vapor source plural films of a strain sensitive electroconductive material onto insulative front surface areas of two separate or separable parts of a sheet material, to form two substantially identical bridge arm means, then bonding the two parts together, back-to-back.

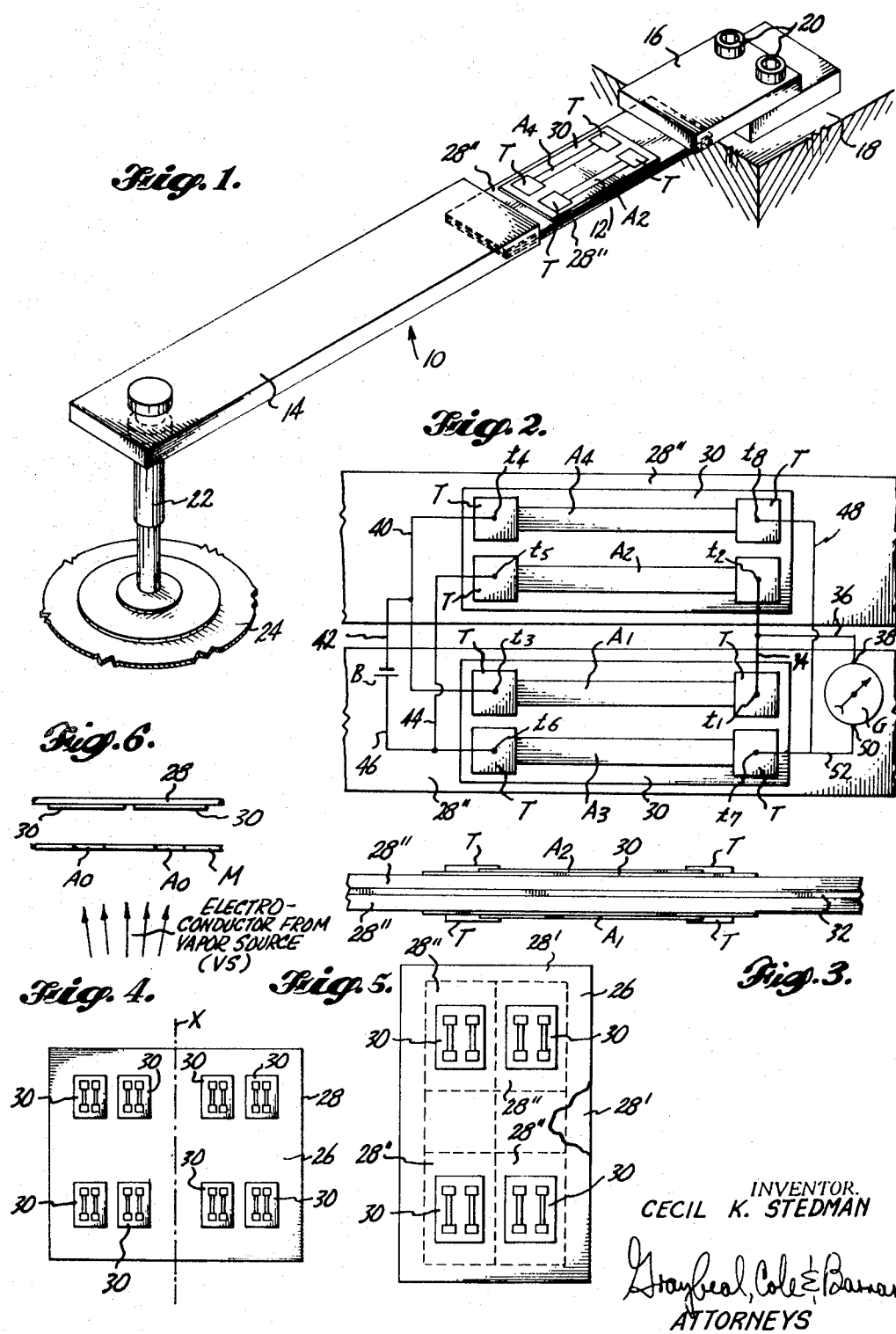

3,621,435

TRANSDUCER BEAM WITH BACK-TO-BACK RELATED DEPOSITED FILM TYPE STRAIN GAGES

CROSS-REFERENCE TO RELATED APPLICATION

This application is a continuation-in-part of my copending application Ser. No. 817,008, filed Apr. 17, 1969, now abandoned entitled "Transducer Beam with Back-To-Back Related Deposited Film-Type Strain Gages," which application was itself a division of Ser. No. 633,116, filed Apr. 24, 1967, now U.S. Pat. No. 3,479,739, issued on Nov. 25, 1969 and entitled "Method of Making a Transducer Beam."

BACKGROUND OF THE INVENTION

A common type of pressure transducer includes a diaphragm that is subjected to and displaced by changes in pressure of a body of fluid. The motion of the diaphragm is measured by means of an instrumented cantilever beam, the free end of which is mechanically connected to the diaphragm. Prior art beams of this type are composed of a flexural member, i.e. the beam itself, two strain gages of a type formed apart from the flexural member (e.g. wire or preformed foil), glued to the side thereof that is subjected to tensile strain when the beam is deflected, and two additional strain gages of the same type glued to the opposite side of the beam which during the same deflection experiences compressive strain. These four strain gages are electrically interconnected so as to form a Wheatstone bridge circuit in which strain induced resistance changes in all four arms contribute additively to the electrical output.

The glued on type of strain gages have been used because heretofore this was the only known way of providing both sides of the beam with strain gages or bridge arms which are sufficiently alike in their response to strain and temperature changes. A disadvantage of the glued on strain gages is that the organic glue that is used cannot withstand very high temperatures or prolonged exposure to nuclear radiation.

SUMMARY OF THE INVENTION

The present invention relates to instrumented beams or flexural elements of the above-described type having well matched stain gages or bridge arms of the deposited film type on each of its opposite sides, whereby organic glue and the problems caused thereby are not involved. Deposited film strain gages are sufficiently well matched in their response to strain and temperature changes only if they are deposited simultaneously. This is because it is practically impossible to sufficiently duplicate deposition conditions from one deposition operation to the next. Only through the use of simultaneously deposited film strain gages can equal change of electrical resistance with age be achieved in all bridge arms of a transducer, and it is this property which must be produced if a transducer is to remain in balance over a period of years. Additionally, the use of simultaneously deposited film strain gages produces bridge arms which undergo like changes in resistance with temperature and which have minimal variations in unstressed resistance, both significant properties which are desirable in transducer manufacture. The present invention provides an instrumented flexural element with deposited film strain gage means on both of two opposite sides, which gages were deposited simultaneously, in a single-deposition step.

Basically, the fabrication method of the present invention comprises: using a single vapor source to simultaneously deposit plural, substantially identical films of a strain sensitive electroconductive material onto uniplanar, insulative front surface areas of two separate or separable parts of a beam element material, to form two substantially identical bridge arm means; then separating the two parts if not already separated; then bonding the two parts together, back-to-back, with care being taken to see that the bridge arm means on each part is in precise registration with the bridge arm means on the other part; and then trimming the bonded sandwich structure to size.

A preferred form of instrumented beam for pressure transducer use comprises a relatively thin and limber, instrumented intermediate portion, constructed according to the above-described technique, which is rigidly interconnected between two thicker and stiffer end portions. One end of the composite beam so formed is fixed in cantilever fashion to a support, and the opposite end or free end is mechanically connected to a pressure responsive diaphragm.

These and other inherent objects, feature, advantages and characteristics of the present invention will be apparent from the following description of typical and therefore nonlimitive embodiments of the invention, as described below in conjunction with the accompanying illustration.

BRIEF DESCRIPTION OF THE DRAWING

In the drawing like element designations refer to like parts; and:

FIG. 1 is a fragmentary perspective view showing an instrumented beam for a pressure transducer rigidly secured at one end to a fixed support, in cantilever fashion, and loaded at its opposite or free end by the diaphragm of the transducer, such beam comprising a relatively limber instrumented portion constructed according to the present invention and including substantially identical deposited film bridge arm means on its two opposite surfaces, which during beam deflection experience tensile and compressive strains, respectively;

FIG. 2 is a plan view of the two parts of the limber section of the beam, laid side-by-side and front sides up, with the bridge input and output circuits being shown diagrammatically;

FIG. 3 is an enlarged side elevational view of the limber section of the instrumented beam shown by FIG. 1, with the relative thicknesses of the various films being exaggerated somewhat for clarity of illustration;

FIG. 4 is a plan view of a sheet of beam material on which a plurality of deposited film bridge arm patterns have been formed, with a cut line being depicted by a broken line;

FIG. 5 is a view of the same type as FIG. 4, but on a larger scale, and showing the severed halves placed back-to-back; and FIG. 6 is a diagrammatical showing of a typical relationship during a deposition step of the sheet beam material (on which has previously been deposited plural films of an insulative material), a strain gage mask, and an electroconductor vapor source.

DESCRIPTION OF THE PREFERRED EMBODIMENTS

The instrumented cantilever beam 10 shown by FIG. 1 may be a part of a pressure transducer of the issued disclosed in my U.S. Pat. No. 3,444,736, issued on May 20, 1969, for example.

Beam 10 is shown to be of composite form and to comprise a thin and relatively limber, instrumented, intermediate portion 12 interconnected between thicker major and minor end portions 14, 16, respectively. Beam 10 is rigidly mounted in cantilever fashion onto a portion of the transducer housing 18, such as by bolts 20 securing the minor end portion 16 to the housing 18. The opposite end of the beam 10 is mechanically linked by a rod 22 to a pressure sensing diaphragm 24.

The preferred fabrication technique of the present invention comprises first using a single-vapor source to evaporatively deposit a film of a suitable insulative material, such as silicon monoxide (SiO), onto the front surface 26 of at least those portions of a thin sheet of an electroconductive beam material 28 which will ultimately become the two parts 28'' of the laminated beam section 12. In the showing of FIG. 3, the thickness of the insulative substrates 30 so formed have been exaggerated for clarity of illustration. The actual thickness thereof need be only sufficient to provide good electrical insulation, e.g. about 80–100 microinches.

The insulative substrates 30 are necessary to insulate the ensuing film strain gages from the base material 28 when the latter is metallic or otherwise electroconductive. However, it is to be understood that the beam material 28 can of itself be insulative in nature, in which case the insulative substrates 30 are not needed and can be omitted. In the preferred form of the invention the beam material 28 is a suitable relatively high tensile strength metal, such as polished stainless steel, and an insulative substrate 30 is employed.

Subsequent to the bonding of the insulative substrates 30 to the front surface 26 of beam material 28, the bridge arms A1, A2, A3, A4 are formed in the desired number on the substrates 30. Each bridge arm A1, A2, A3, A4 comprises a continuous, unbroken film or sheet of a suitable electroconductive material, such as a chromium-silicon alloy, which has been formed in bonded relation to and well within the edges of a film of the insulative substrate 30. In FIG. 3, the thickness of the arms A1, A2 has been exaggerated for clarity of illustration. In actual practice the film arms A1, A2, A3, A4 can be exceedingly thin and should be sufficiently thin to provide a substantial resistance to current flow between the input terminals (e.g. 1,000 ohms). When using the alloy Cr (60 percent)—Si (40 percent) as the electroconductive material, for example, the film thereof is suitably about 200-500 Angstroms thick. In configuration, each film arm A is in general a rectangle with a continuous uninterrupted surface edge-to-edge, with the two opposed sides being substantially parallel to each other.

The film-type strain gages A1, A2, A3, A4 are formed by the technique known as vacuum deposition, generally known per se.

A discussion of the formation of strain gages by vacuum deposition can be found in the article "Thin-Film Strain-Gage Transducers," by Peter R. Periro, published in the Dec. 1965 issue of Instruments & Control Systems. This article is hereby incorporated herein by reference.

According to the fabrication technique of the present invention, the sheet of beam material 28 (or plural identical sheets) is placed in a conventional vacuum chamber (not shown). The vacuum chamber equipment includes masking means for the insulative substrate films, masking means for the bridge arm films, an insulative vapor source, and an electroconductive vapor source. The masks are arranged in closely spaced relation to the portions of the surface 26 onto which the various film deposits are to be formed, and the respective vapor sources are shielded from the surface 26 by the respective masks except at apertures in the masks by which the film areas are formed.

With a sheet of beam material 28 in place within the vacuum chamber, and with the vacuum chamber operating at a suitable vacuum (e.g. at a pressure of about $10^{-7}$ millimeter), the masking means for forming the insulative substrate films 30 is brought into a position over the material 28. The insulation vapor source is activated so that it generates vapor of a suitable insulation material, such as silicon monoxide (SiO), resulting in the deposition of an insulative substrate 30 on the surface 26 of beam material 28 at each location of an aperture.

By way of typical and therefore nonlimitive example, the sheet of beam material 28 depicted by FIG. 4 is shown to have had eight insulative substrate films 30 deposited on it. In other words, it was prepared for providing the requisite number of parts for completing four instrumented beam portions 12.

Following deactivation of the insulation vapor source, the insulative substrate film-masking means is replaced by the bridge arm film-masking means M (FIG. 6), and the bridge arm apertures AO thereof are correctly aligned with the insulative substrate deposits 30. The electroconductive vapor source VS is then actuated, resulting in the formation on each insulative substrate 30 of a bridge arm pattern, shown in the illustrated preferred embodiment of the invention to consist of two arms per insulative substrate 30.

It is to be noted at this point that according to the technique of this invention each bridge arm means is formed simultaneously with the bridge arm means with which it will be related in a back-to-back manner upon completion of the instrumented beam portion of which they both will be a part. A single vapor source VS is used, and during deposition the receptive substrates 30 for the ultimately paired bridge arm means lie in the same plane, are spaced essentially the same distance from the vapor source, and are exposed to the same vacuum and vapor conditions. This identity of deposition conditions results in all the gages or bridge arms which will eventually work together, but on opposite sides of the beam portion 12, having substantially the same physical characteristics, and consequently substantially the same ageing, and temperature change response characteristics.

The use of deposition techniques which fail to provide identity of deposition conditions result in the production of bridge arms which exhibit variations among the individual arms of a single gage in (a) change in resistance under stress (gage factor), (b) unstressed resistance, (c) change in resistance with temperature, and (d) change of resistance with age. Variations in gage factor are of minimal significance in transducer production because these variations only affect the calibration factor of the instrument and each instrument is individually calibrated in any case. The use of simultaneous film deposition, which provides bridge arms of substantially identical gage factor, is thus not critical to correct variations of this type. With regard to variations in unstressed resistance, it is desirable to have the bridge arms as near balanced as possible when they are deposited, but each bridge is individually balanced by a trimming process in any event. Thus, although desirable, the use of simultaneous film deposition is again not critical. The failure of the bridge arms to change resistance with temperature in the same way, however, is much more unsatisfactory. Compensating for the variation of bridge balance with temperature at the time of assembly is possible. In actual practice, however, there is a premium on minimizing the amount of such compensation required because it imposes penalties. For example if the compensation is provided by temperature sensitive resistors mounted separately in the instrument case, their temperature will not instantaneously follow that of the bridge arms during rapid changes of ambient temperature. Thus the use of simultaneous film deposition which produces bridge arms having similar variation in resistance with temperature is highly desirable.

Finally, the property which is most important in bridge arm production, and which can only be produced by the simultaneous deposition of the bridge arms which ultimately are disposed on opposite sides of the beam portion 12 is change of resistance with age. Simultaneous deposition produces bridge arms of uniform character which age in substantially the same manner. A pressure transducer which is initially balanced to give a zero electrical output signal at zero p.s.i.g., must, in order to be of any value, continue to give this signal at this pressure over a period of years. Thus the use of simultaneous film deposition is mandatory to prevent variations in this factor.

The bridge arms A1, A2, A3, A4 may be provided with deposited film terminal portions T of a more electroconductive material, such as chromium (Cr). The terminal portions T are also formed together in a single-deposition step.

Following completion of the deposition process, the sheet 28 is cut approximately along the line X and the two halves 28" are related back-to-back with precise registration of the bridge arm patterns so that each individual arm is substantially exactly opposite another identical arm on the opposite side of the sandwich. While precise registration is maintained, the two halves are bonded together, preferably by vacuum brazing of the two pieces of beam material 28. In FIG. 3 the bonding material has been exaggerated in thickness, and is designated 32. Next, the sandwich is cut into individual beam portions (substantially along the cut lines depicted in FIG. 5), each having two bridge arms on each of its two opposite sides.

Each beam portion 12 is interconnected between the end portions 14, 16 of a completed beam 14, such as by electron beam welding, brazing, spot welding, or otherwise securing the parts 12, 14, 16 together.

In the illustrated embodiment of the invention, the upper pair of bridge arms experience compressive strain and the lower pair of arms experience tensile strain when the free end of beam 10 is raised above the fixed end thereof by a pressure produced force transmitted from the diaphragm 24 through the connecting rod 22 to the free end of beam 10. When the free end of the beam 10 is pulled downwardly below the fixed end thereof the character of the strain experienced by the upper and lower pairs of strain gages is reversed.

As diagrammatically shown in FIG. 2, the four strain gages are electrically interconnected so as to form a Wheatstone bridge circuit in which strain induced resistance changes in all four arms contribute additively to the electrical output. In this respect, adjacent ends of arms A1, A2, which are paired opposite each other on opposite sides of the beam portions 12. are electrically coupled together by a conductor 34 interconnected between terminal points $t1, t2$. Arm terminals $t1, t2$ are also connected by conductor means 34, 36 to one terminal 38 of a means for measuring electrical potential, depicted simply as gage G. Terminal $t3$ at the opposite end of arm A1 is electrically coupled to terminal $t4$ of arm A4, by a conductor means 40. Terminal $t3, t4$ are also connected to one terminal of a source of electrical potential B, by conductor means 40, 42. Terminal $t5$ at the second end of arm A2 is electrically coupled to terminal $t6$ at one end of arm A3, by conductor means 44, and such terminals $t5, t6$ are both connected to the second terminal of the source of electrical potential B, by conductor means 44, 46. The remaining two terminals $t7, t8$, located at adjacent ends of bridge arms A3, A4, respectively, are electrically coupled together by conductor means 48, and to the second terminal 50 of the electrical potential measuring means G, by conductor means 52.

Although the laminated self-flexure sensing element 12 has been shown and described in the form of a limber portion of a composite-type cantilever beam, it will be readily recognized that a laminated structure of this type can compose the entire beam. Also, the insulative substrate may be a single deposit over the entire front surface 26 of the beam material 28, rather than to selected definite areas thereof. The bridge arms may be formed by a vacuum deposition of a film of electroconductive material followed by an etching of the film to the desired shape. In some installations the bridge arm means on each side of the beam or element may comprise only a single arm.

Further modifications, variations, arrangements of instrumented beams for pressure transducers and for self-flexure sensing elements in general, will occur to those skilled in the art to which the invention is addressed, within the scope of the following claims.

I claim:

1. A flexural element for a measuring instrument, of a type having strain gage means on both of two opposite faces for sensing surface strain incident to bending of said element, said flexural element comprising two pieces of a resilient sheet material, each having an insulative front face, a back, and a deposited film bridge arm means of strain sensitive electroconductive material on its insulative front face, said deposited film bridge arm means on both of said front faces being of substantially identical constituency and adapted to undergo equal change of electrical resistance with age, and means permanently bonding the said pieces together, back-to-back, with the bridge arm means on each said piece in register with the bridge arm means on the other piece.

2. The flexural element of claim 1, wherein the back portion of each piece of sheet material is metallic and said pieces are brazed together.

3. The flexural element of claim 1, wherein each bridge arm means comprises at least one deposited film bridge arm of said strain sensitive electroconductive material, and a terminal deposit at each end thereof of a more conductive electroconductive material.

4. The flexural element of claim 1, wherein said sheet material is electroconductive and the insulative front faces of said pieces comprise deposited film of an insulative material.

5. A flexural element for a measuring instrument, of a type having strain gage means on both of two opposite faces for sensing surface strain incident to bending of said element, said flexural element comprising two pieces of a resilient sheet material, each having an insulative front face, a back, and a film bridge arm means of strain sensitive electroconductive material on its insulative front face, said film bridge arm means on both of said front faces being of the simultaneously deposited type, and means permanently bonding the said pieces together, back-to-back, with the bridge arm means on each said piece in register with the bridge arm means on the other piece.

6. A flexural element for a measuring instrument, of a type having strain gage means on both of two opposite faces for sensing surface strain incident to bending of said element, said flexural element comprising two pieces of a resilient sheet material, each having an insulative front face, a back, and a film bridge arm means of strain sensitive electroconductive material on its insulative front face, said film bridge arm means on both of said front faces being of the simultaneously deposited type such that all of said bridge arm means are substantially identical in constituency, change of electrical resistance with temperature and change of electrical resistance with temperature and change of electrical resistance with age; and means permanently bonding the said pieces together, back-to-back, with the bridge arm means on each said piece in register with the bridge arm means on the other piece.

7. A flexural element for a measuring instrument, of a type having strain gage means on both of two opposite faces for sensing surface strain incident to bending of said element, said flexural element comprising two pieces of a resilient sheet material, each having an insulative front face, a back, and a deposited film bridge arm means of strain sensitive electroconductive material on its insulative front face, the deposited film bridge arm means on both of said front faces being substantially identical in constituency, unstressed resistance and change in resistance under stress; and means permanently bonding the said pieces together, back-to-back, with the bridge arm means on each said piece in register with the bridge arm means on the other piece.

8. The flexural element of claim 7, wherein the back portion of each piece of sheet material is metallic and said pieces are brazed together.

9. The flexural element of claim 7, wherein each bridge arm means comprises a pair of substantially identical deposited film bridge arms.

10. The flexural element of claim 7, wherein each bridge arm means comprises at least one deposited film bridge arm of said strain sensitive electroconductive material, and a terminal deposit at each end thereof of a more conductive electroconductive material.

11. The flexural element of claim 7, wherein said sheet material is electroconductive and the insulative front faces of said pieces comprise deposited film of an insulative material.

* * * * *